(12) United States Patent
Lim et al.

(10) Patent No.: US 6,488,726 B1
(45) Date of Patent: Dec. 3, 2002

(54) LAMP FUEL COMPOSITION FOR COLORED FLAMES AND MANUFACTURING METHOD THEREOF

(75) Inventors: Jinman Lim, 39-1204, Hyundai A. P. T., Ohgum-dong, Songpha-gu, Seoul, 138-740 (KR); Younggu Kim, Dongduchon (KR)

(73) Assignee: Jinman Lim, Seoul (KR)

( * ) Notice: Subject to any disclaimer, the term of this patent is extended or adjusted under 35 U.S.C. 154(b) by 0 days.

(21) Appl. No.: 09/785,440

(22) Filed: Feb. 20, 2001

(51) Int. Cl.⁷ .................................................. C10L 1/18
(52) U.S. Cl. .............................. 44/451; 44/452; 44/457; 44/418; 44/642
(58) Field of Search .......................... 44/451, 452, 457, 44/418, 642

(56) References Cited

U.S. PATENT DOCUMENTS

| 4,705,532 A | * | 11/1987 | Mazanec et al. | 44/452 |
| RE33,562 E | * | 4/1991 | Badger | 44/437 |
| 5,990,057 A | * | 11/1999 | Sharp | 44/451 |

* cited by examiner

*Primary Examiner*—Cephia D. Toomer
(74) *Attorney, Agent, or Firm*—Nath & Associates PLLC; Gary M. Nath; Joshua B. Goldberg

(57) ABSTRACT

This invention relates to lamp fuel composition for colored flames and manufacturing method thereof, comprising solvents, coloring agents, capillary linkers, supporters, and flavors. The lamp fuel composition for colored flames presented by this invention provides sustained powerful flames of various colors, such as green, red, yellow, blue, or pink, producing a decorative lighting, wherein the said composition is prepared through a series of process, such as stirred-blending, heating, and then cooling.

8 Claims, No Drawings

LAMP FUEL COMPOSITION FOR COLORED FLAMES AND MANUFACTURING METHOD THEREOF

BACKGROUND OF THE INVENTION

1. Field of the Invention

The present invention relates to lamp fuel composition for colored flames and manufacturing method thereof. More specifically, this invention relates to lamp fuel composition for brilliant colored flames for interior decoration or various festivals, and desirable manufacturing method thereof.

2. Description of the Prior Art

In the prior art, wick-used lamp fuel for colored flames which have remarkable effect of interior decoration or festival decor is not reported, but without using wick, liquid combustion composites for luminous flames of various colors, such as red, green, yellow, blue, and the like is known art (CN U.S. Pat. No. 1,102,175). Although wick-used candle composites for colored flames refers to U.S. Pat. No. 5,127,922, such composites cannot been put to the practical use as lamp fuel because it is impossible to use the composites themselves as lamp fuel; metal salts in the composites are toxic; and highly inflammable solvents which dissolve the composites are not suitable for using as lamp fuel for interior decoration or festival considering the possibility of fire. Moreover, when burning such metal salts are charred and harden at lamp container, and hence cannot show action as a so-called wick of wick which absorbs up the lamp fuel on the principle of the capillary phenomenon, to result in a notable decrease in respect of the sustenance of combustion. In this invention considering above-mentioned problems, it is purposed that a harmless lamp fuel for colored flames and manufacturing method thereof can be provided, containing human-nontoxic luminous compounds instead of human-toxic metal salts.

Another purpose of this invention is to provide lamp fuel composition for colored flames, wherein the said lamp fuel composition can continuously produce colored flames in the similar state with lamp wick not hardening.

Further purpose of this invention is to provide lamp fuel composition for colored flames, wherein for interior decoration or festival the fuel lamp composition contains compounds of low inflammability in the fuel apt to cause a fire.

Finally, additional purpose of this invention is to provide lamp fuel composition for colored flames, wherein the combustion of the lamp fuel composition cannot be accompanied by any smells or fumes and the combustible materials may not pollute surrounding environment.

SUMMARY OF THE INVENTION

The purpose of this invention is achieved by using as lamp fuel and then evaluating the above-mentioned composition, which comprises solvent dissolving coloring agent which provides colored flames when burning, capillary linker, flavor, and supporter; and which is prepared through a series of process, such as stirred- blending, heating, and then cooling.

DETAILED DESCRIPTION OF THE PREFERRED EMBODIMENTS

The lamp fuel composition for colored flames is characterized by the step of selecting luminous coloring agent;
the step of preparing alcohol solution;
the step of electrolysis at the established temperature, voltage, and current in the said alcohol solution;
the step of preparing thermally stable metal colloidal solution which is obtained by airtight-heating the solution prepared by the said electrolysis at high temperature and high pressure; and
the step of adding capillary linker, supporter and flavor to the prepared metal colloidal solution, or in another way after dissolving coloring agent directly in solvent, adding the said capillary linker, supporter and flavor to such colloidal solution, followed by stirring, heating, and cooling to prepare the above-mentioned lamp fuel composition.

The coloring agent of the lamp fuel composition presented in this invention is selected depending on a type of colored flames. The selection of such coloring agent results in producing a characteristic flame and intended decoration effect.

According to kind of coloring agent, the composition of this invention can provide one colored flames selected from the group consisting of red, green, yellow, blue, pink, violet, or light purple colored flames, and manufacturing method thereof can vary to some extent.

Following examples are provided only for illustrative purposes, but they are not intended to limit the scope of the invention.

EXAMPLE 1

Preparing a Lamp Fuel Composition for Red Colored Flames

The lamp fuel composition for red colored flames presented by this invention was constituted as shown in Table 1, below.

TABLE 1

| Ingredients | ratio (%, w/w) |
| --- | --- |
| Strontium colloidal solution | 5~30 |
| Propylene glycol | 60~90 |
| Dimethyl formamide | 5~30 |
| Lauryl alcohol | 0.2~2 |
| Camphor | 0.5 |
| Turpentine oil | 0.01 |
| Total | 100 |

After a mixture of alcohol and water, or alcohol solution was prepared in an electrolytic bath, a solution containing 3~5% of strontium was obtained by electrolyzing strontium as a anode in the prepared alcohol solution at 30° C., DC 12V and 10~15 Amp/cm, and then the strontium solution was heated in a sealed oven with high pressure at about 250° C., to yield thermally stable strontium colloidal solution in which strontium is used as coloring metal.

The lamp fuel composition for red colored flames presented by this invention was obtained by uniformly stirred-blending the ingredients in Table 1. The used strontium is a coloring agent, and propylene glycol and dimethyl formamide is a combustion fuel or a supporter. If the composition of this invention is burned, metal strontium is subject to combustion and produces luminous red color, and propylene glycol and dimethyl formamide which are substantial fuels act as supporters sustaining combustion. Therefore, when the composition of this invention is burned, decorative lighting of luminous red color is obtained, any toxic and polluting compounds are not produced, and lauryl alcohol prevents hardening of lamp wick, and further possibility of an accidental fire by careless treatment of this lamp fuel composition is relatively low because ignition temperature of the lamp fuel composition itself is relatively high.

Propylene glycol as the main combustible in the above ingredients, may be substituted with other glycol selected from the group consisting of glycerin, triethanolamine, dipropylene glycol, or ethylene glycol, and dimethylformamide as the supporter of combustion may be substituted with compound selected from the group consisting of ethyl alcohol, methyl alcohol, isopropyl alcohol, amino alcohol, or acetone, and uses of such equivalent compounds are intended to be included within the scope of the following claims.

EXAMPLE 2

Another example of the lamp fuel composition for colored (red) flames presented by this invention was prepared by the same constituents in example 1, except that 5~30% (w/w) of metal lithium colloidal solution was used as coloring agent.

The lithium colloidal solution in example 2 was prepared according to the method shown in example 1, and instead of the strontium colloidal solution, the lithium colloidal solution was used contrary to example 1.

EXAMPLE 3

Further another example of lamp fuel composition for colored(red) flames presented by this invention was constituted as shown in Table 2, below.

TABLE 2

| Ingredients | ratio (%, w/w) |
| --- | --- |
| Lithium Stearate | 0.04~0.1 |
| Ethyl Alcohol | 5 |
| Propylene Glycol | 50 |
| Ethylene Glycol mono Ethyl Ether | 35 |
| Butanol | 9 |
| Lauryl Alcohol | 0.2~2 |
| Camphor | 0.5 |
| Turpentine oil | 0.01 |
| Total | 100 |

In method of manufacturing the lamp fuel composition presented by this invention, lithium stearate was added to ethyl alcohol and was stirred at room temperature to be completely dissolved, resulting in solution 1. Subsequently, a mixture of propylene glycol, butanol, and ethylene glycol mono ethyl ether was stirred with heating in a mixer tank at 50° C., and the resulting colloidal solution was blended with solution 1, which is red-coloring agent, followed by stirring at the said fixed temperature for 10 minutes. After finally adding lauryl alcohol as capillary linker, camphor as flavor and supporter, and turpentine oil as flavor and heating power increasing agent, the mixture was stirred at 50° C. for 30 minutes, and was cooled, confirming that capillary linker, flavor, supporter, and heating power increasing agent was completely dissolved.

Instead of the lithium stearate, salts or derivatives of strontium was used as coloring agent for red colored flames presented by this invention.

The said lamp fuel composition for red colored flames consisting of coloring agents, combustibles, supporters, and flavors can provide decoration light exposing luminous flames, and never contains lethal lead detectable. Consequently, compared with paraffin or petroleum fuel in prior art, advantages of the products in this invention are more sanitary and of neither soot nor smell.

Additionally, in this invention the composition of lamp fuel for red flames is harmless to human bodies because the said composition contains less amount of strontium or lithium compounds(0.04~0.1% (w/w)), and the feature that the composition may not harden wick of lamp enables sustained use of the wick.

In the example of this invention, strontium compounds or their derivatives, with which lithium compounds are substituted, can be selected from the group consisting of glycols, such as dipropylene glycol, ethylene glycol, polypropylene glycol, and polyethylene glycol; alcohol such as methyl alcohol, isopropyl alcohol, and amino alcohol; dimethyl formamide, glycerin, and acetone, independently with suitable amount thereof. Such selection of glycols or alcohols and modification of ratio thereof, after the departure of this invention, can vary depending upon users of this invention, and such selection or modification performed by the users are intended to be included within the scope of the following claims.

EXAMPLE 4

Lamp Fuel Composition for Green Colored Flames and Manufacturing Method Thereof

The lamp fuel composition for green colored flames presented by this invention was constituted as shown in Table 3, below.

TABLE 3

| Ingredients | Ratio (%, w/w) |
| --- | --- |
| Boric Acid | 3.5~4 |
| Ethyl Alcohol | 5 |
| Ethylene Glycol mono Ethyl Ether | 35 |
| Butanol | 9 |
| Propylene Glycol | 45~50 |
| Lauryl Alcohol | 0.2~0.3 |
| Camphor | 0.4 |
| Turpentine oil | 0.01 |
| Total | 100 |

In method of manufacturing the lamp fuel composition for green colored flames, boric acid was added to ethyl alcohol and was stirred at room temperature to be completely dissolved, resulting in solution 1. Subsequently, a mixture of propylene glycol, butanol, and ethylene glycol mono ethyl ether was stirred with heating in a mixer tank at 50° C., and the resulting colloidal solution was blended with solution 1, which is green-coloring agent, followed by stirring at the said fixed temperature for 10 minutes. After finally adding lauryl alcohol as capillary linker, camphor as flavor and supporter, and turpentine oil as flavor and heating power increasing agent, the mixture was stirred at 50° C. for 30 minutes, and was cooled, confirming that capillary linker, flavor, supporter, and heating power increasing agent was completely dissolved.

Copper salt, which is toxic to human bodies, cannot be used as green-coloring agent for the composition of this invention.

The said lamp fuel composition for green colored flames containing of coloring agents, combustibles, supporters, and flavors can provide decoration light producing luminous flames, and when compared with paraffin or petroleum fuel in prior art, advantages of the products in this invention are more sanitary and of neither soot nor smell.

The coloring agents for the lamp fuel composition for green colored flames presented are this invention include, in addition to boric acid, various kinds of metal salts, which are not available because of their toxicity to human bodies.

Boric acids, which are included in various products, such as cosmetics, preservatives, toothpastes, and disinfectants, are almost harmless to human bodies, and provides a brilliant green light or a charming festive mood in banquet halls or celebration parties by using such boric acids as coloring agents of the lamp fuel composition presented by this invention.

Another feature of the composition presented by this invention is that the composition does not harden lamp wicks, because first the ratio of the lamp fuel composition is desirable and boric acids are not fused at a wick temperature resulting in ideal combustion.

In the examples of this invention, glycols and alcohols (including high-quality alcohols) are included in the lamp fuel composition. In the examples of this invention, basic composition constituents contains of propylene glycol, ethylene glycol mono ethyl ether, and ethyl alcohol; additionally glycols such as glycerin, dipropylene glycol, and diethylene glycol are used for the composition; and less harmful cosmetics-materials selected from the group consisting of dimethyl formamide, methyl alcohol, isopropyl alcohol, and amino alcohol are used as supporters. Such selection of glycols or alcohols and modification of ratio thereof, after the departure of this invention, can vary depending upon users of this invention, and such selection or modification performed by the users are intended to be included within the scope of the following claims.

EXAMPLE 5

Lamp Fuel Composition for Orange Colored Flames and Manufacturing Method Thereof The lamp fuel composition for orange colored flames presented by this invention was constituted as shown in Table 4, below.

TABLE 4

| Ingredients | ratio (%, w/w) |
| --- | --- |
| Borax | 0.02 |
| Sodium Chloride | 0.01 |
| Ethyl Alcohol | 5 |
| Ethylene Glycol mono Ethyl Ether | 50 |
| Butanol | 9 |
| Lauryl Alcohol | 0.2~0.3 |
| Comphor | 0.5 |
| Turpentine oil | 0.01 |
| Total | 100 |

In method of manufacturing the lamp fuel composition for orange colored flames, borax with sodium chloride as coloring agent was added to ethyl alcohol and was stirred at room temperature to be completely dissolved, resulting in solution 1. Subsequently, a mixture of propylene glycol, butanol, and ethylene glycol mono ethyl ether and other composition constituents was added to solution 1 and stirred at 60° C. for 25 minutes until the resulting mixture was transparent. Additionally in this invention, glycols, such as glycerin, dipropylene glycol, or diethylene glycol can be used instead of the said glycol; and less harmful cosmetics-materials selected from the group consisting of diethyl formamide, methyl alcohol, isopropyl alcohol, and amino alcohol, can be used as supporters.

EXAMPLE 6

Lamp Fuel Composition for Blue Colored Flames and Manufacturing Method Thereof

This example is almost the same with example 3, 4, or 5, and the composition was constituted as shown in Table 5, below.

TABLE 5

| Ingredients | Ratio (%, w/w) |
| --- | --- |
| Copper Chloride | 1~5 |
| Ethyl Alcohol | 5 |
| Propylene Glycol | 50 |
| Ethylene Glycol mono Ethyl Ether | 35 |
| Butanol | 9 |
| Lauryl Alcohol | 2~3 |
| Camphor | 5 |
| Turpentine oil | 0.1 |
| Total | 100 |

In method of manufacturing the lamp fuel composition for blue colored flames, 5% (w/w) of copper chloride(CuCl2) as coloring agent was added to ethyl alcohol and was stirred at room temperature to be completely dissolved, and subsequently propylene glycol, butanol, and ethylene glycol mono ethyl ether were added and stirred at 50° C. for 25 minutes, and then after 2% (w/w) of lauryl alcohol, camphor, and turpentine oil were added and stirred at 50° C. for 25 minutes, the resulting mixture was cooled to room temperature, stored in a storage tank, and supplied for experiments.

EXAMPLE 7

Lamp Fuel Composition for Pink Colored Flames and Manufacturing Method Thereof

The lamp fuel composition for pink colored flames comprised the same constituents with above-mentioned example 6 and table 5 except strontium chloride as coloring agent. 1% (w/w) of strontium chloride was dissolved in 5% (w/w) of ethyl alcohol, and subsequently 50% (w/w) of propylene glycol, 9% (w/w) of second butanol, and 35% (w/w) of ethylene glycol mono ethyl ether were added and stirred at 50° C., and then after 2% (w/w) of lauryl alcohol, 5% (w/w) of camphor, and 0. 1% (w/w) of turpentine oil were added and stirred for 20 minutes, the resulting mixture was cooled to room temperature, stored in a storage tank, and supplied for experiments.

EXAMPLE 8

Lamp Fuel Composition for Violet Colored Flames and Manufacturing Method Thereof The lamp fuel composition for violet colored flames comprised the same constituents with above-mentioned example 6 and table 5 except cerium chloride as coloring agent. 1% (w/w) of cerium chloride was dissolved in 5% (w/w) of ethyl alcohol, and subsequently 50% (w/w) of propylene glycol, 9% (w/w) of butanol, and 35% (w/w) of ethylene glycol mono ethyl ether were added and stirred at 50° C., and then after 2.5% (w/w) of lauryl alcohol, 5% (w/w) of camphor, and 0.1% (w/w) of turpentine oil were added and stirred for 20 minutes, the resulting mixture was cooled to room temperature, stored in a storage tank, and supplied for experiments.

EXAMPLE 9

Lamp Fuel Composition for Light Purple Colored Flames and Manufacturing Method Thereof The lamp fuel composition for light purple colored flames comprised the same constituents with above-mentioned example 6 and table 5 except cesium chloride as coloring agent. 2% (w/w) of cesium chloride was dissolved in 5% (w/w) of ethyl alcohol, and subsequently 50% (w/w) of propylene glycol, 9% (w/w) of second butanol, and 35% (w/w) of ethylene glycol mono ethyl ether were added and stirred at 50° C., and then after 2.5% (w/w) of lauryl alcohol, 5% (w/w) of camphor, and 0.1% (w/w) of turpentine oil were added and stirred for 20 minutes, the resulting mixture was cooled to room temperature, stored in a storage tank, and supplied for experiments.

EXAMPLE 10

Lamp Fuel Composition for White-rose Colored Flames and Manufacturing Method Thereof The lamp fuel composition for white-rose colored flames presented by this invention was constituted as shown in Table 6, below.

TABLE 6

| Ingredients | Ratio (%, w/w) |
| --- | --- |
| Nitromethane | 40~60 |
| Methyl Alcohol | 5 |
| Dimethyl Formamide | 40~50 |
| Camphor | 1 |
| Turpentine oil | 0.1 |
| Total | 100 |

In method of manufacturing the lamp fuel composition for white-rose colored flames, 50% (w/w) of nitromethane with dimethyl formamide was added to 5% (w/w) of methyl alcohol and stirred in a mixer tank for 20 minutes until completely dissolved, and then after less 1% (w/w) of camphor and 0.1% (w/w) of turpentine oil were added and stirred at 40° C., the resulting mixture was cooled to room temperature, stored in a storage tank, and supplied for experiments.

The examples being thus described, the lamp fuel composition for colored flames presented by this invention includes an infinitesimal quantity of coloring agents instead of metal salts harmful to human bodies, and for use of festival or interior decoration, such lamp fuel composition should be prepared with ignition temperature high enough not to cause fire. Such smoke, which can be caused by paraffin; any smell; and any trouble of absorption of fuel, which caused by hardened wick, are not allowed for the lamp fuel composition. Thus, this invention provides a novel type of lamp fuel composition, including synthesis of propylene glycol with a compound selected from the group consisting of ethylene glycol mono ethyl ether, methyl ether, or ethyl alcohol.

Additionally, since propylene glycol as a basic material of lamp fuel can be changed to an ether form on its molecular structures and has terminal OH, the dissolution/dispersion of the coloring agents and its stability are excellent, while several troubles are raised, such as poor absorption of fuel caused by high viscosity; and difficulty in ignition caused by the high ignition temperature(99° C.). So when preparing this invention's composition, in order to overcome the said troubles and to improve its ignitability, ethylene glycol mono ethyl ether is added, and in order to support the dissolution/dispersion of the coloring agents, 5% (w/w) of ethyl alcohol is added.

The products of this invention are not non-polar compounds, such as petroleum and paraffin, and, as solvents, enable coloring agents to be dispersed easily, but this invention's products are poorly absorbed through wicks. In this reason, as a capillary linker, lauryl alcohol is added. Lauryl alcohol disperses easily in compounds; such as propylene glycol, ethylene glycol mono ethyl ether, methyl ether, or ethyl ether, and its fatty acid supply continuously lamp fuel to the wick.

Camphor is used as a supporter as well as a flavor, and turpentine oil containing a flavor of pine tree's smell is added to play a role as a heating power increasing agent as well as a flavor supporter.

What is claimed is:

1. A manufacturing method for a lamp fuel composition for producing red colored flames comprising the steps of:

preparing an alcohol solution by mixing alcohol and water in an electrolytic bath;

obtaining a strontium or lithium solution by electrolyzing strontium or lithium as an anode in the alcohol solution;

preparing a thermally stable strontium or lithium colloidal solution by heating the strontium or lithium solution in a sealed oven; and adding propylene glycol, dimethyl formamide, lauryl alcohol, camphor, and turpentine oil to the colloidal solution and then mixing with stirring.

2. The method according to claim 1, wherein the electrolysis is accomplished at 30° C., DC 12V, and 10 to 15 Amp/cm.

3. The method according to claim 1, wherein the strontium or lithium solution comprises 3 to 5% of strontium or lithium respectively.

4. The method according to claim 1, wherein the lamp fuel composition comprises 5 to 30% (w/w) of the colloidal solution, 60 to 90% (w/w) of the propylene glycol, 5 to 30% (w/w) of the dimethyl formamide, 0.2 to 2% (w/w) of the lauryl alcohol, 0.5% (w/w) of the camphor, and 0.01% (w/w) of the turpentine oil.

5. A manufacturing method for a lamp fuel composition for producing colored flames comprising the steps of:

preparing a solution 1 by adding a coloring agent to ethyl alcohol and stirring until said coloring agent is completely dissolved;

preparing a mixture by mixing propylene glycol, butanol, and ethylene glycol mono ethyl ether and stirring with heating at 50° C.;

adding the solution 1 to the mixture and stirring to obtain a resulting solution;

adding lauryl alcohol, camphor, and turpentine oil to the resulting solution and stirring with heating until each component is completely dissolved to obtain a resulting product; and cooling the resulting product.

6. The method according to claim 5, wherein the coloring agent is selected from the group consisting of lithium stearate, salts or derivatives of strontium, boric acid, sodium chloride, copper chloride ($CuCl_2$), strontium chloride, cerium chloride, and cesium chloride.

7. The method according to claim 5, wherein the lamp fuel composition comprises 0.01 to 5% (w/w) of the coloring agent, 5% (w/w) of the ethyl alcohol, 45 to 50% (w/w) of the propylene glycol, 35% (w/w) of the ethylene glycol mono ethyl ether, 9% (w/w) of the second butanol, 0.2 to 3% (w/w) of the lauryl alcohol, 0.4 to 5% (w/w) of camphor, and 0.01 to 0.1% of the turpentine oil.

8. A manufacturing method for a lamp fuel composition for producing white-rose colored flames comprising the steps of:

adding 40 to 60% (w/w) of nitromethane and 40 to 50% (w/w) of dimethyl formamide to 5% (w/w) of methyl alcohol and stirring until each component is completely dissolved to obtain a resulting solution;

adding 1% (w/w) of camphor and 0.1% (w/w) of turpentine oil to the resulting solution and stirring at 40° C. to obtain a resulting product; and cooling the resulting product.

* * * * *